United States Patent
Choubey et al.

(10) Patent No.: US 8,004,401 B2
(45) Date of Patent: *Aug. 23, 2011

(54) SYSTEM AND METHOD TO MANAGE MOVEMENT OF ASSETS

(75) Inventors: Suresh K. Choubey, Delafield, WI (US); Narendra B. Joshi, Sussex, WI (US)

(73) Assignee: General Electric Company, Schenectady, NY (US)

( * ) Notice: Subject to any disclaimer, the term of this patent is extended or adjusted under 35 U.S.C. 154(b) by 135 days.

This patent is subject to a terminal disclaimer.

(21) Appl. No.: 12/501,887

(22) Filed: Jul. 13, 2009

(65) Prior Publication Data

US 2009/0273466 A1 Nov. 5, 2009

Related U.S. Application Data

(63) Continuation of application No. 11/695,103, filed on Apr. 2, 2007, now Pat. No. 7,573,382.

(51) Int. Cl.
*G08B 1/08* (2006.01)

(52) U.S. Cl. ........... 340/539.13; 340/539.1; 340/539.12; 340/539.16; 340/573.1; 340/825.49; 340/825.69; 340/286.07

(58) Field of Classification Search ............ 340/539.13, 340/539.12, 539.16, 539.17, 539.1, 572.1, 340/573.1, 825.49, 825.69, 286.07; 128/903, 920; 600/300, 301

See application file for complete search history.

(56) References Cited

U.S. PATENT DOCUMENTS

| | | | |
|---|---|---|---|
| 6,396,413 B2 * | 5/2002 | Hines et al. | 340/825.49 |
| 6,876,303 B2 | 4/2005 | Reeder et al. | |
| 6,954,148 B2 | 10/2005 | Pulkkinen et al. | |
| 7,015,811 B2 * | 3/2006 | Decker et al. | 340/539.22 |
| 7,289,825 B2 | 10/2007 | Fors et al. | |
| 7,394,380 B2 | 7/2008 | Ballin et al. | |
| 2007/0282476 A1 | 12/2007 | Song et al. | |

* cited by examiner

*Primary Examiner* — Hung T. Nguyen

(57) ABSTRACT

An embodiment of a system to manage movement of at least one asset is provided. The system includes at least one tracking element operable to generate a signal representative of a location of the asset, and a controller in communication with the tracking element. The controller includes computer readable program instructions representative of the steps of receiving the signal representative of the location of the asset having a unique identifier; identifying a status indicator for the asset having the unique identifier; comparing a change in the location of the asset in view of the status indicator relative to a predetermined location change rule of an invalid movement of the at least one asset from one state to another without passing through a CLEANING state; and generating a signal representative of the invalid change in the location in response to an output of the comparing step for illustration on a display.

15 Claims, 9 Drawing Sheets

SYSTEM AND METHOD TO MANAGE MOVEMENT OF ASSETS

RELATED APPLICATIONS

This is a continuation that hereby claims priority to U.S. application Ser. No. 11/695,103 filed on Apr. 2, 2007, now U.S. Pat. No. 7,573,382, and the entirety of which is hereby claimed herein by reference.

BACKGROUND OF THE INVENTION

This invention generally relates to a system for and method of managing at least one asset, and more particularly, to a system to track and limit movement of the at least one asset.

Larger industrial, healthcare or commercial facilities can be spread out over a large campus and include multiple floors each having multiple rooms. Each of the facilities can employ various assets used in manufacturing or providing services. For example, a healthcare facility or hospital employs numerous assets that can be spread out over a large campus and/or moved from room to room. Examples of assets include intravenous pumps, wheel chairs, digital thermometers, local patient monitors, etc. A similar scenario can be said for an industrial facility that includes various portable pumps, hoists, winches, etc.

There is a need for a system operable to track the location and movement of these assets across the facilities at any moment in time. There is also a need for a system to track desired versus undesired movement of the assets from one location to another.

BRIEF DESCRIPTION OF THE INVENTION

The above-mentioned shortcomings, disadvantages and problems are addressed by the embodiments described herein in the following description.

An embodiment of a system to manage movement of at least one asset is provided. The system includes at least one tracking element operable to generate a signal representative of a location of the at least one asset; and a controller in communication with the at least one tracking element. The controller includes a processor in communication with a memory, the memory including a plurality of program instructions to instruct the processor in execution of the steps of: receiving the signal representative of the location of the at least one asset having a unique identifier, identifying one of a plurality of status indicators for the at least one asset dependent on the signal representative of the location of the of the at least one asset, comparing a change in one of the plurality of status indicators of the at least one asset relative to at least one predetermined rule, and generating a display illustrative of a valid or an invalid change in the one of the status indicator in response to an output of the comparing step. The plurality of status indicators include a USE state, a DIRTY state, a CLEANING state, an INVENTORY state, and a SERVICE state. The USE state represents the at least one asset being utilized by a subject, the DIRTY state represents the at least one asset being stored temporarily before being taken to one of a location of the CLEANING state or the SERVICE state, the CLEANING state represents the at least one asset either waiting to be or in the process of being cleaned, the INVENTORY state represents the at least one asset previously moved from the CLEANING state is now in storage until deployed for use in accordance with the USE state, and the SERVICE state represents the at least one asset requiring repair or to be discarded. The at least one predetermined rule includes a rule of invalid movement of the at least one asset from the DIRTY state to one of the USE state and the INVENTORY state without passing through the CLEANING state.

An embodiment of a method of managing movement of at least one asset between a series of locations is provided. A method of managing movement of at least one asset between a plurality of locations, the method comprising the steps of: receiving the signal representative of the location of the at least one asset having a unique identifier; identifying one of a plurality of status indicators for the at least one asset dependent on the signal representative of the location of the of the at least one asset, the plurality of status indicators including a USE state, a DIRTY state, a CLEANING state, an INVENTORY state, and a SERVICE state, where the USE state represents the at least one asset being utilized by a subject, wherein the DIRTY state represents the at least one asset being stored temporarily before being taken to one of a location of the CLEANING state or the SERVICE state, wherein the CLEANING state represents the at least one asset either waiting to be or in the process of being cleaned, wherein the INVENTORY state represents the at least one asset previously moved from the CLEANING state is now in storage until deployed for use in accordance with the USE state, and wherein the SERVICE state represents the at least one asset requiring repair or to be discarded; comparing a change in one of the plurality of status indicators of the at least one asset relative to at least one predetermined rule, the at least one predetermined rule including a rule of invalid movement of the at least one asset from the DIRTY state to one of the USE state and the INVENTORY state without passing through the CLEANING state; and generating a display illustrative of a valid or an invalid change in the one of the status indicator in response to an output of the comparing step.

An embodiment of a computer readable medium that comprises a series of modules of computer-readable program instructions for execution by a computer is also provided. The series of modules of computer readable program instructions include a first module to receive a signal representative of a location of the at least one asset having a unique identifier; a second module to identify a status indicator for the at least one asset having the unique identifier, the status indicator representative of a type of utilization of the at least one asset correlated to a location of the at least one asset; a third module to compare a change in the location of the at least one asset in view of the status indicator relative to a predetermined location change rule, the predetermined rule including a rule of an invalid movement of the at least one asset from the DIRTY state to one of the USE state and the INVENTORY state without passing through the CLEANING state; and a fourth module to generate a signal representative of the invalid change in response to an output of the comparing step for illustration on a display.

Systems and methods of varying scope are described herein. In addition to the aspects and advantages described in this summary, further aspects and advantages will become apparent by reference to the drawings and with reference to the detailed description that follows.

state, a "cleaning/maintenance" state, an "in use" state, an "unclean/dirty" state, and a "being serviced" state.

Figure 3:
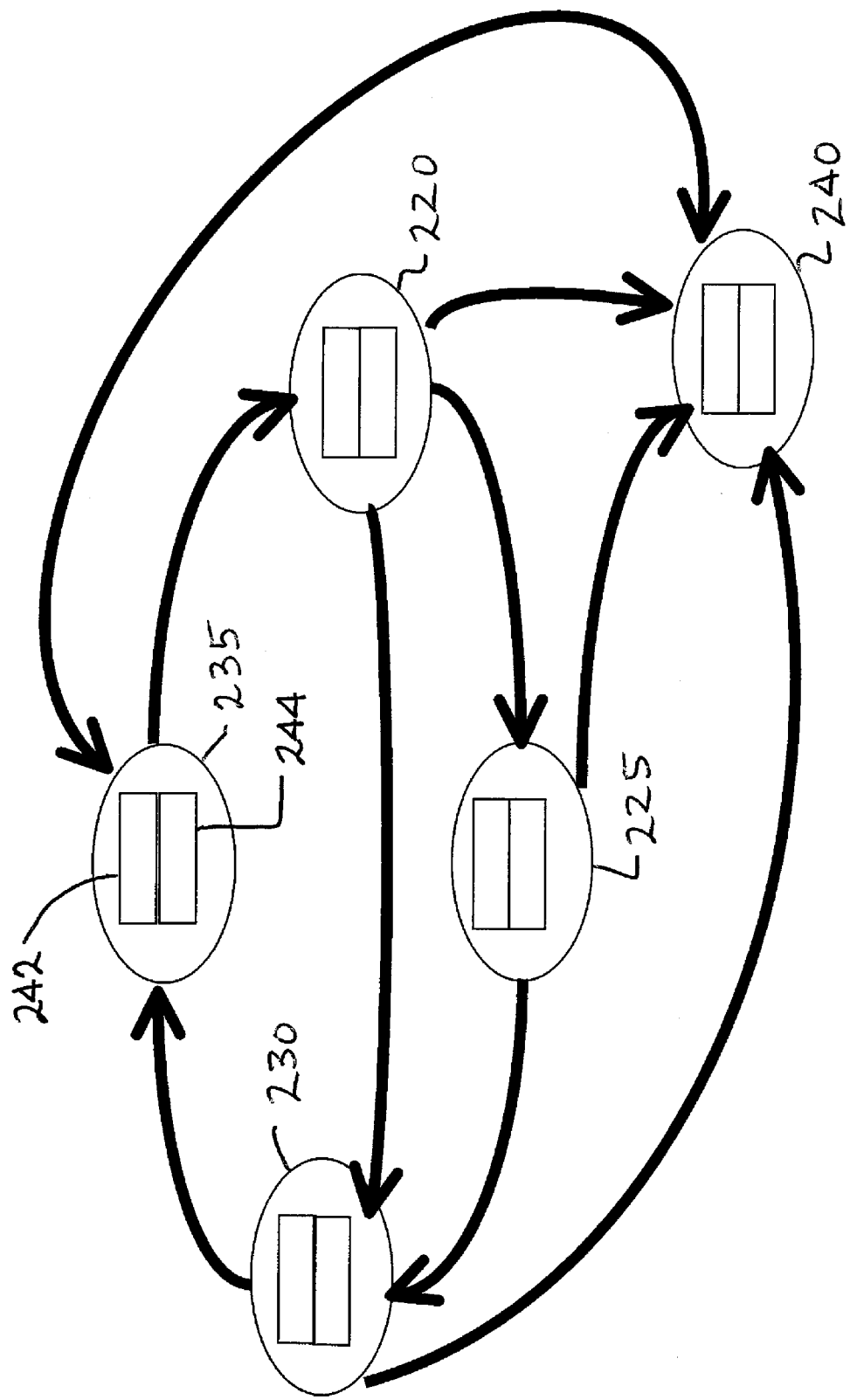
FIG. 3 illustrates an example of a state diagram to track movement of an at least one asset between an "inventory"
Figure 4:
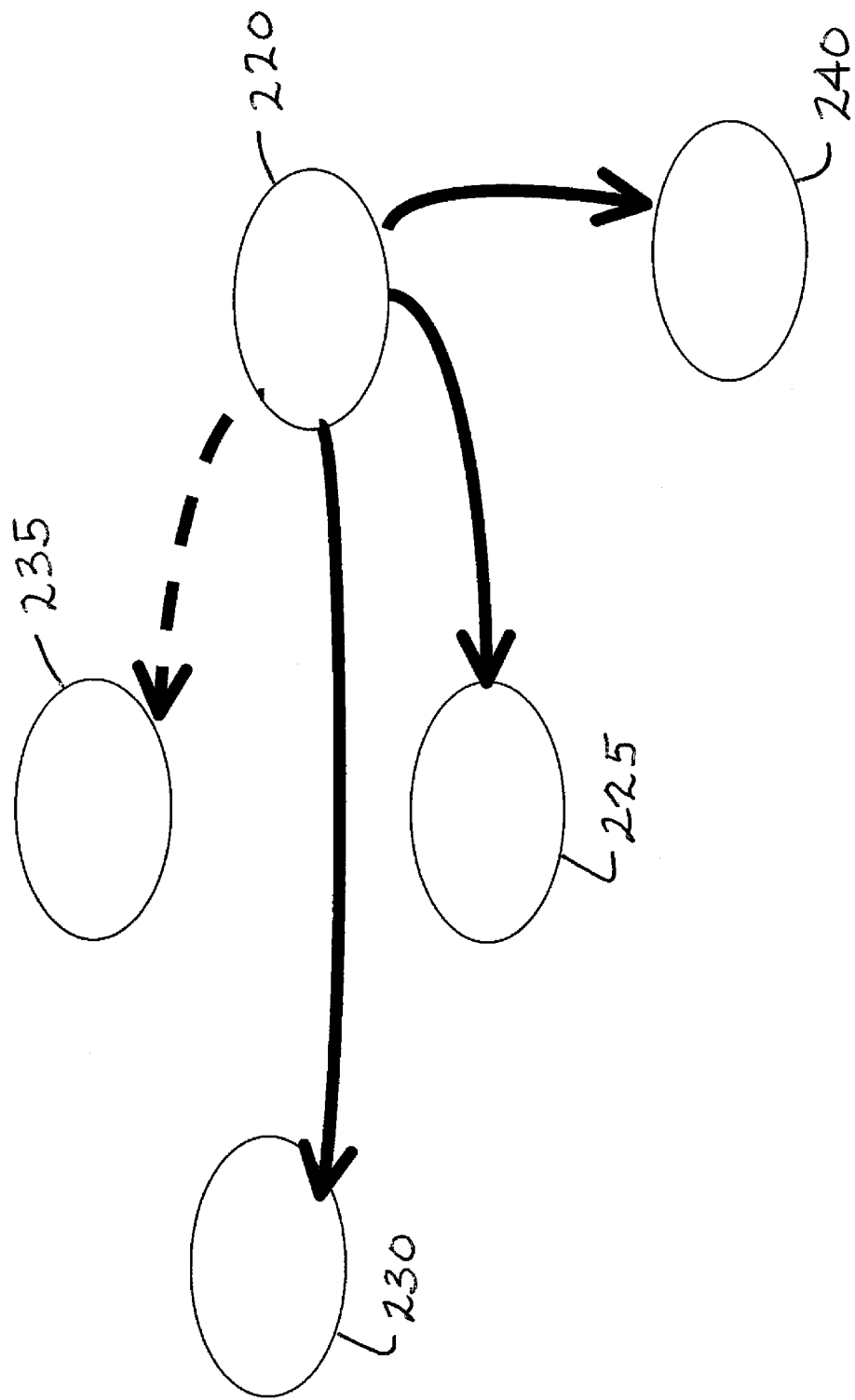

FIG. 4 shows an example of tracking movement of at least one asset to and from a USE state as shown in FIG. 3.

Figure 5:
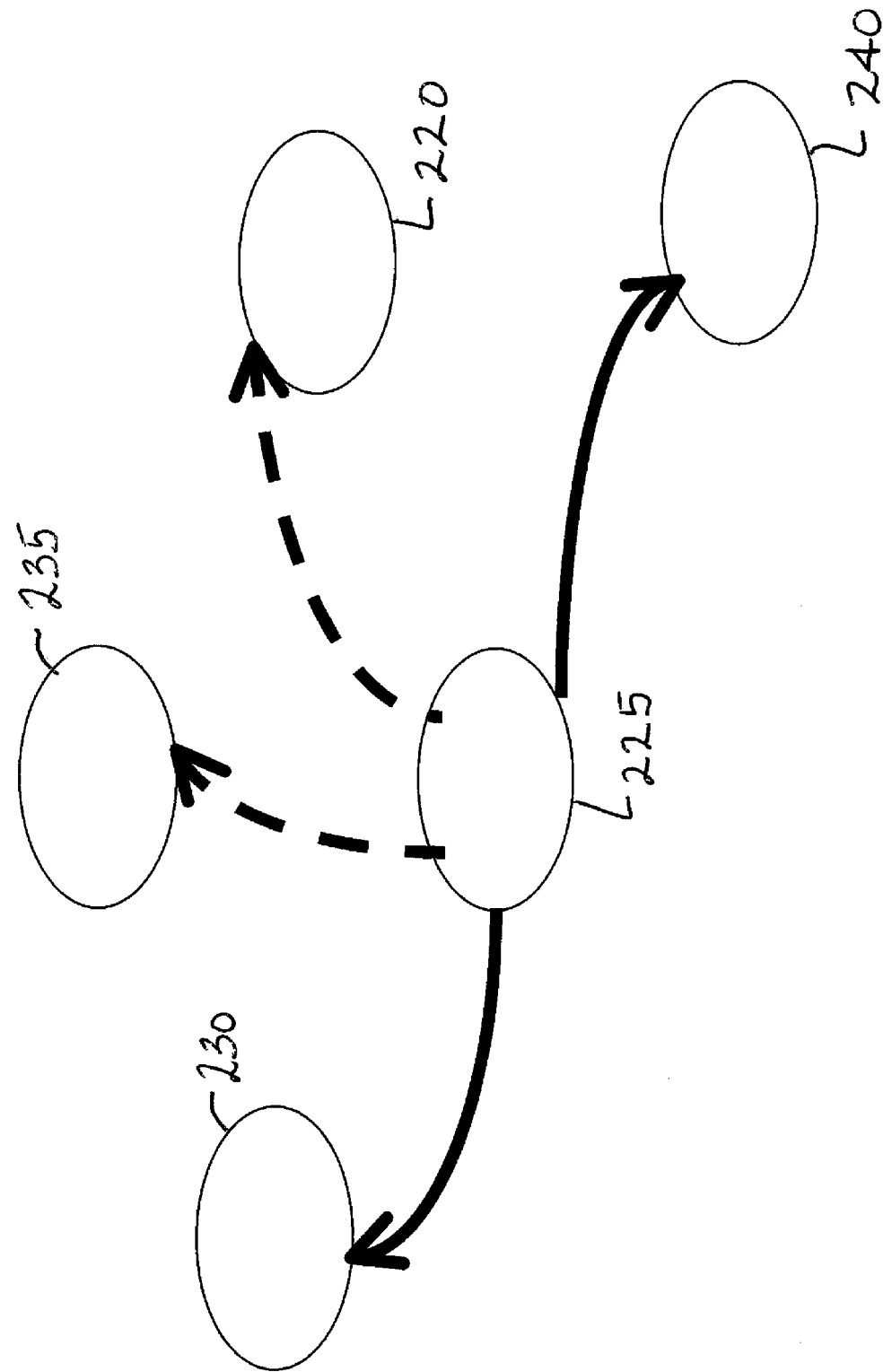

FIG. 5 shows another example of tracking movement of at least one asset to and from a DIRTY state as shown in FIG. 3.

Figure 6:
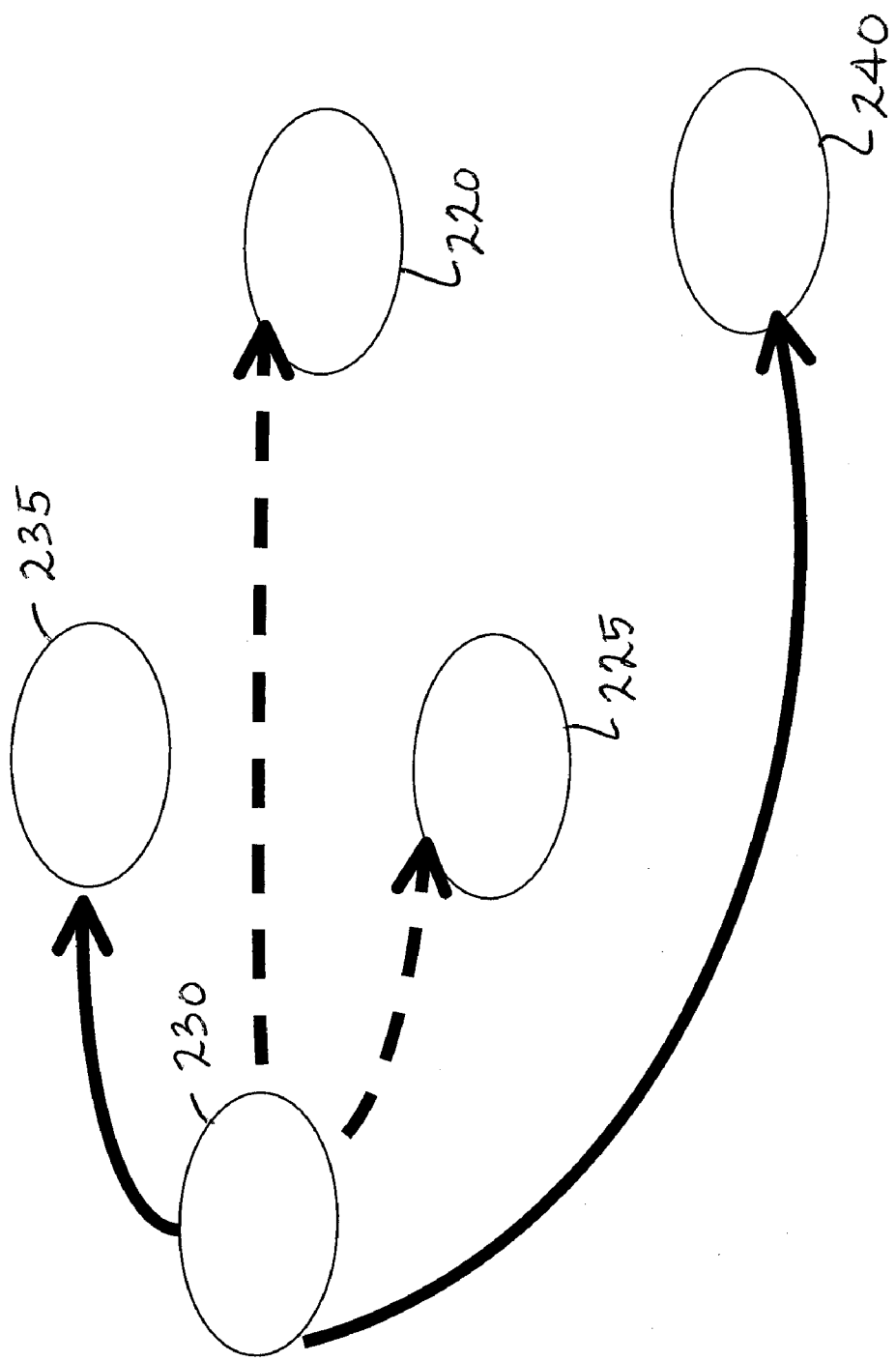

FIG. 6 shows another example of tracking movement of at least one asset to and from a CLEANING state as shown in FIG. 3.

Figure 7:
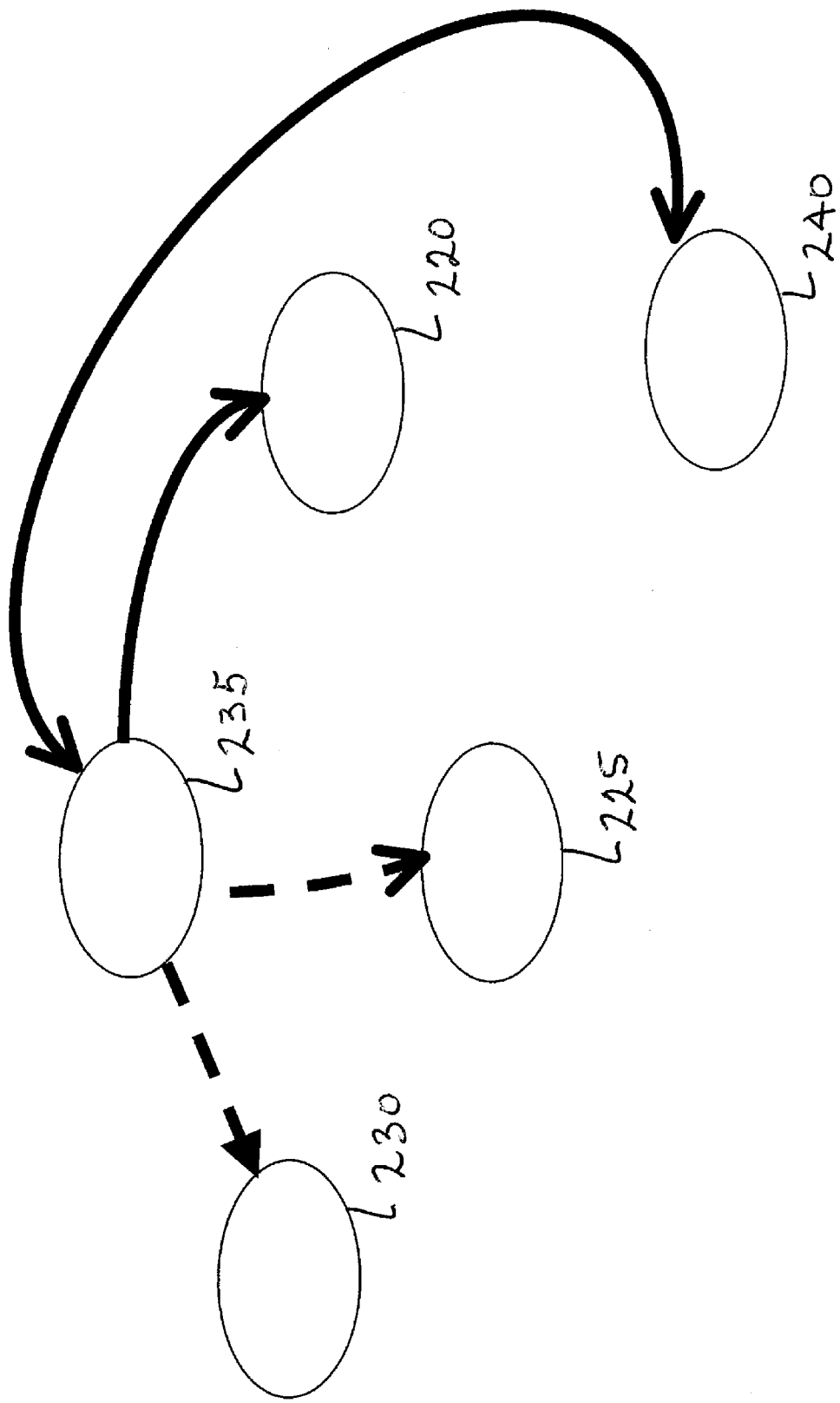

FIG. 7 shows another example of tracking movement of at least one asset to and from an INVENTORY state as shown in FIG. 3.

Figure 8:
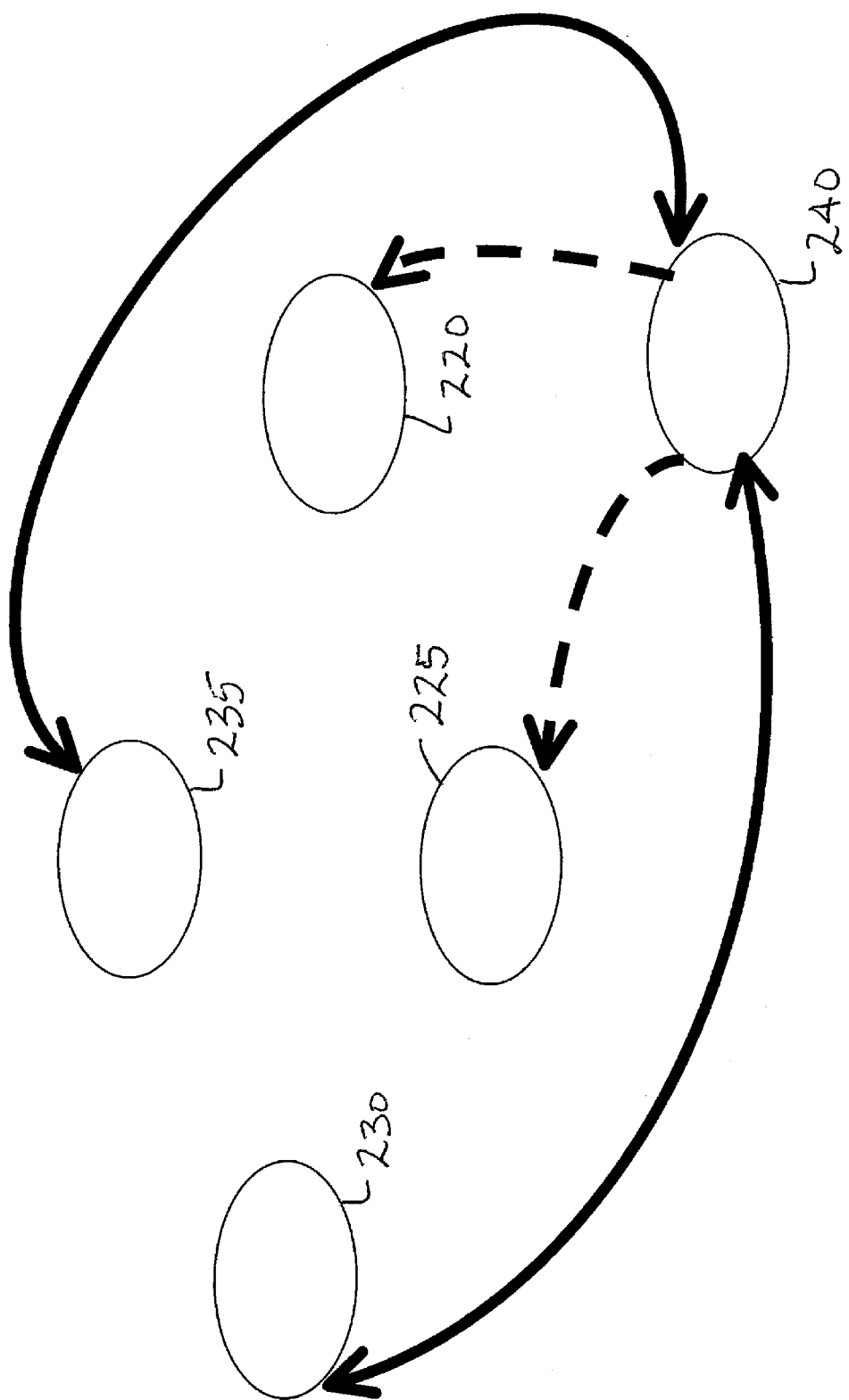

FIG. 8 shows another example of tracking movement of at least one asset to and from a SERVICE state as shown in FIG. 3.

Figure 9:
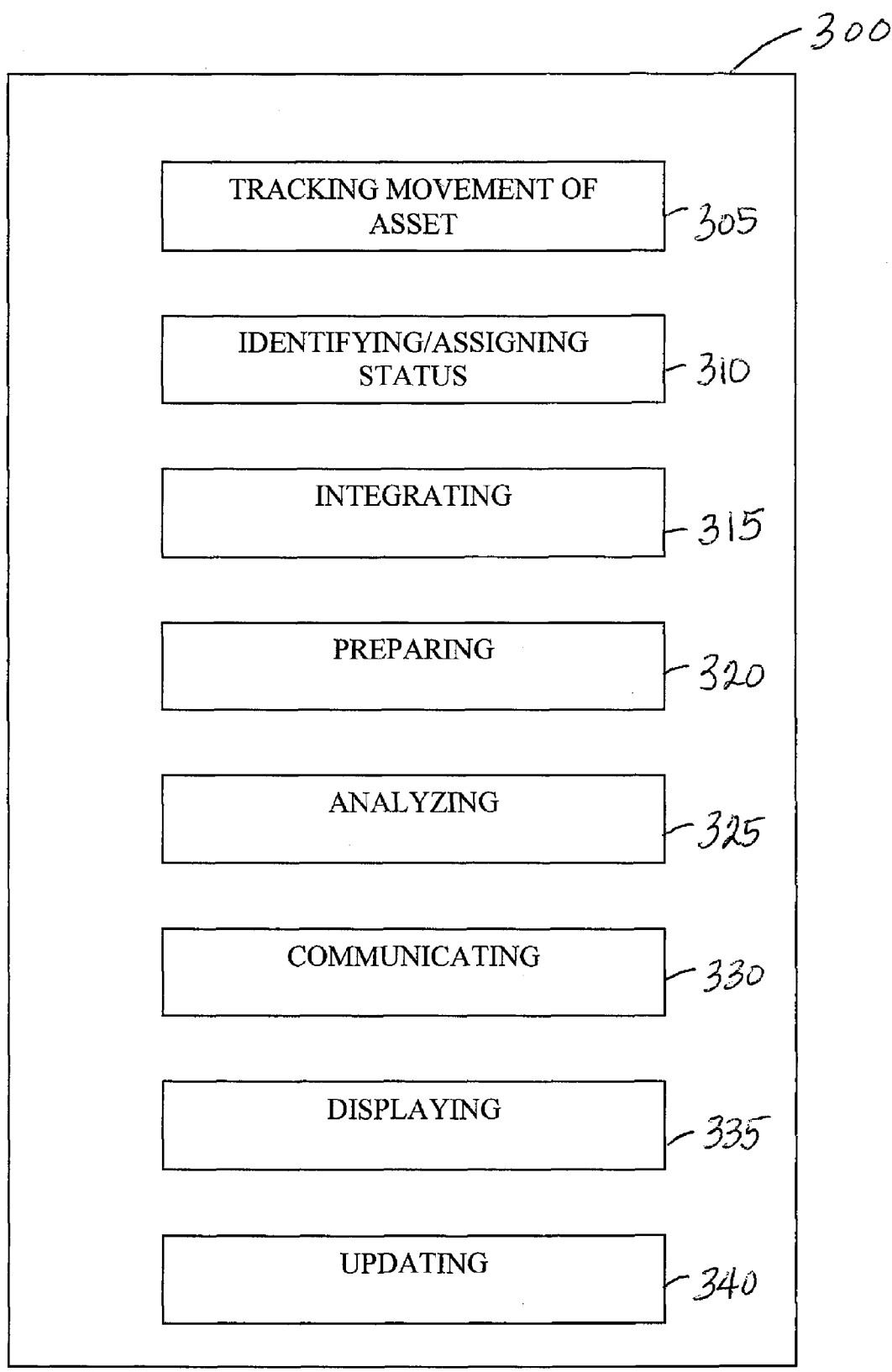

FIG. 9 shows an example of product with a medium including a series of computer-readable program instructions for execution by a processor or computer.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
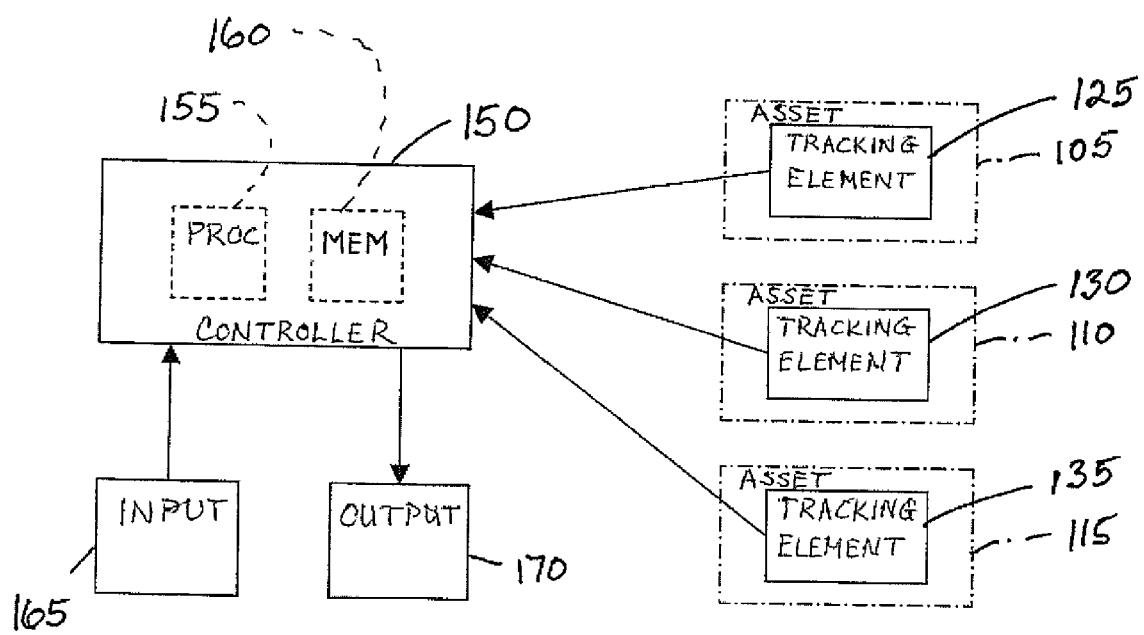
FIG. 1 shows a schematic block diagram of an embodiment of a system operable to track a location and movement of a series of assets.

FIG. 1 illustrates one embodiment of a system 100 for managing and monitoring at least one asset 105, 110 and 115. The exemplary system 100 includes a controller 120 in communication via a wireless connection (e.g., radio frequency, etc.) or wired connection (e.g., communication bus, etc.) with the series of assets 105, 110 and 115. Communication can be direct, or over an Internet or Ethernet or local area network (LAN) communications network. An embodiment of the series of assets 105, 110 and 115 are medical devices employed at one or more hospital or healthcare or the like facilities. An embodiment of the first asset 105 can be an intravenous pump, the second asset 110 can be a wheelchair, and the third asset 115 can be a healthcare personnel or a patient. Yet, the number and types of assets 105, 110 and 115 can vary. Although the following description is in reference to assets 105, 110 and 115 associated with a hospital or healthcare facility, it should be understood that the subject matter is not so limited. The assets 105, 110 and 115 can be associated with various industrial or commercial environments or facilities. Facility as referred to in this application includes an entity of multiple departments (e.g., a clinic having individual departments for oncology, urology, cardiology, etc.) at a common street address or utilizing a common wireless network. It should be understood that the system 100 can be used to track movement of assets 105, 110, and 115 at multiple facilities where tracking movement of assets 105, 110, and 115 between facilities includes communication over an outside service provider communication network.

The system 100 includes a series of tracking elements 125, 130, and 135 located for each asset 105, 110 and 115, respectively. The tracking elements 125, 130, and 135 are generally operable to create a signal indicative of a location or state of the respective assets 105, 110 and 115. Examples of the tracking elements 125, 130, and 135 can include a geographic positioning system (GPS) receiver in communication with a satellite, electromagnetic receivers and transmitters, radio frequency identification (RFID) tags, radio frequency (rf) transmitters and receivers, or the like or combination thereof operable to locate a position (e.g., a room location at a facility, a geographic location having a latitude and longitude, a coordinate, etc.) of the respective assets 105, 110, and 115 relative to a reference. Each of the tracking elements 125, 130, and 135 may track multiple assets 105, 110, and 115. Also, any one asset 105, 110, and 115 may be tracked by multiple tracking elements 125, 130, and 135 or by additional tracking systems not described herein. The type of technique of tracking system and elements 125, 130 and 135 can vary.

The system 100 further includes a controller 150 in communication with the tracking elements 125, 130, and 135 so as to track movement of the assets 105, 110 and 115 between various states or locations. An embodiment of the controller 150 can include a computer in a desktop configuration or laptop configuration. Yet, the type of controller 150 can vary.

The controller 150 generally includes one or more processors 155 in communication with a memory 160 having a computer-readable storage medium. The storage medium is operable to receive and store a plurality of programmable instructions for execution by the processor 155. An embodiment of the controller 150 is also connected in communication with an input device 165 and an output device 170. The input device 165 can include one or combination of a keyboard, touch-screen, remote computer workstation, mouse, etc. or the like operable to receive data from an operator. The output device 170 can include a display comprising one or combination of a monitor, a large departmental display area or map at control station, an alarm, light emitting diodes (LEDs), printer, pager, palm pilot, cell phone, etc. operable to visually or audibly show an output of the controller 150 for illustration to an operator. The controller 150 can also be connected in communication with a remote computer station or back office (not shown).

Having described a general construction of one embodiment of the system 100, the following is a general description of an embodiment of a method 200 of operating the system 100 for managing the series of assets 105, 110, and 115. It should be understood that the method 200 can be represented as a plurality of programming instructions stored in the memory 160 for execution by the processor 155 of the controller 150. It should also be understood that the sequence of the acts or steps in the foregoing description can vary. Also, it should be understood that the method 200 may not require execution of each act or step in the foregoing description, or may include additional acts or steps not disclosed herein.

Figure 2:
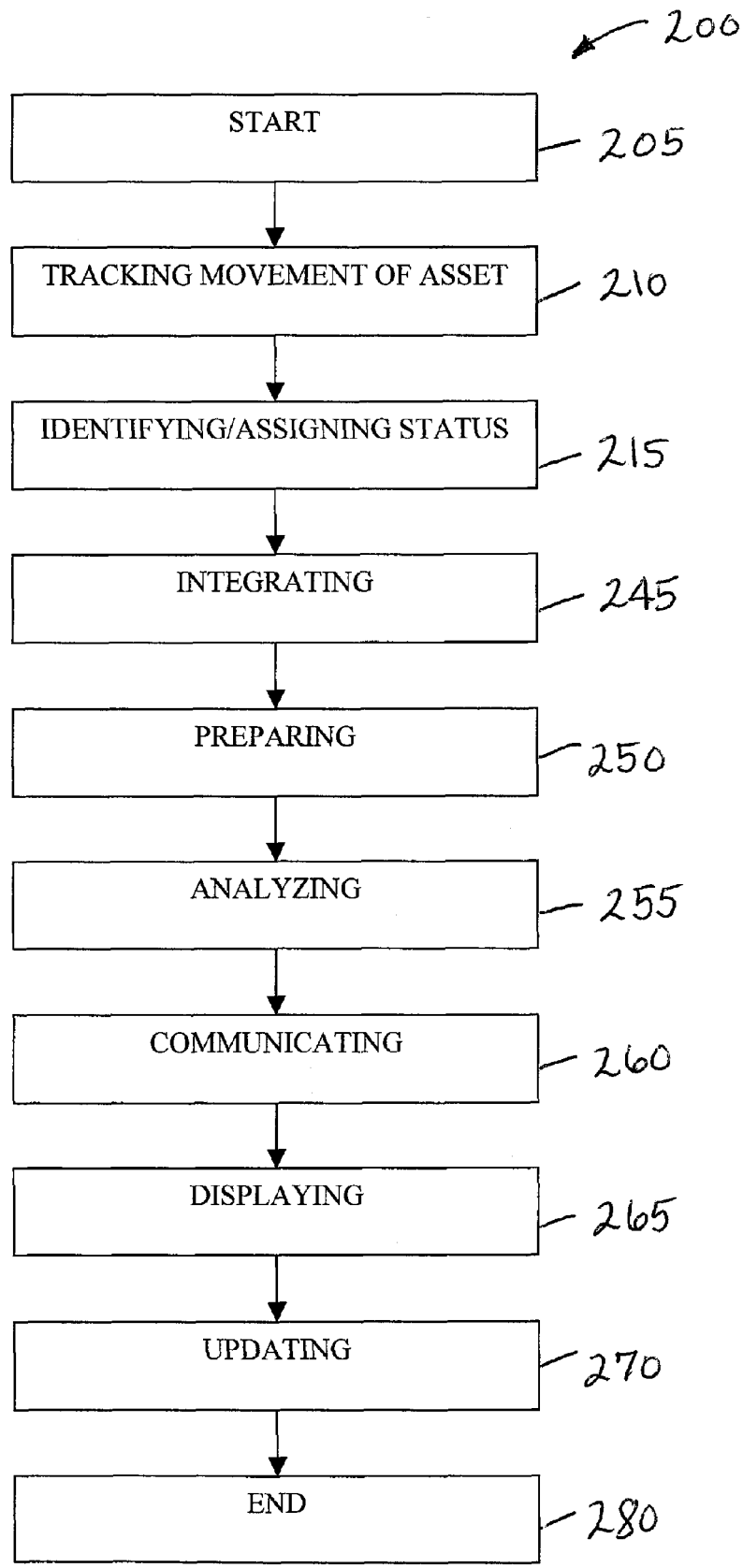
FIG. 2 illustrates an embodiment of a method to track movement of at least one asset.

FIG. 2 illustrates one embodiment of the method 200. Step 205 is the start of the method 200. Step 210 includes identifying and tracking movement of the at least one asset 105, 110, and 115 associated with a unique identifier between different locations or rooms or departments. An embodiment of the step 210 includes receiving a signal with a unique identifier representative of a location of the assets 105, 110, and 115 on a continuous or periodic basis from each of the tracking elements 105, 110, and 115.

Step 215 includes identifying or assigning one of a plurality of status indicators to track and regulate valid versus invalid movement of the assets 105, 110, and 115 with the unique identifier. An embodiment of the state or state or status indicator of each asset 105, 110, and 115 is correlated via a predetermined map to a room location or coordinate. This state-to-location correlation as represented in the map can be adjusted or reassigned at any time. Mapping does not require hard program code, hence the difference the states 220, 225, 230, 235 and 240 can be mapped to different locations.

Referring now to FIG. 3, one embodiment of the status indicators include a USE status or state 220, a DIRTY state 225, a CLEANING state 230, an INVENTORY state 235, and a SERVICE state 240 of each of the assets 105, 110, and 115.

The USE state 220 represents the assets 105, 110, and 115 being utilized by a patient or subject either in a patient room or with the patient transitioning from one point or location to another either for a walk or to get testing.

The DIRTY state 225 represents the assets 105, 110, and 115 being temporarily stored before being taken to a location of a CLEANING state 230 or, if malfunctioning, to the SERVICE state 240.

The CLEANING state 230 represents status of the assets 105, 110, and 115 either waiting to be or in the process of being cleaned of debris so as to be available for future utilization according to the USE state 220.

The INVENTORY state 235 represents status of the assets 105, 110, and 115 that have previously been moved from the CLEANING state 230 and are now in storage until deployed for use in accordance with the USE state 220 described above.

The SERVICE state 240 represents status of the assets 105, 110, and 115 after malfunctioning or requiring repair or to be discarded in the trash.

Step 215 can include tracking the status indicator of one or more of the assets 105, 110, and 115 having the unique identifier on a continuous or periodic basis. In one example, the status is communicated with location data for the asset 105, 110, and 115 from the respective tracking elements 125, 130, and 135. In another example, the status indicator can be automatically assigned in accordance to a predetermined schedule correlating each of the series of status indicators to one or more possible detected or tracked locations of each of the assets 105, 110, and 115. For example, a status indicator can be automatically assigned to the unique identifier of the asset to be in the USE state if the location of the asset 105, 110, and 115 is detected to be in a patient room or location correlated according to a predetermined schedule to the USE state. Alternatively, the status indicator can be manually entered at the input 156 to the controller 150 for each asset 105, 110, and 115.

Step 215 can further include tracking or measuring a dwelling time 242 that each asset 105, 110, and 115 spends in a particular state 220, 225, 230, and 240. Step 215 may further include measuring a total quantity 244 of a type of asset 105, 110, and 115 assigned to a particular state 220, 225, 230, and 240. These data 242 and 242 can be used to perform higher order purchasing or rental analyses, generating alarms to restock assets 105, 110 and 115 at the INVENTORY state, performing need manpower analyses for each state (e.g., the CLEANING state 230 or SERVICE state 240), etc.

Step 245 includes integrating the tracking data for the location and state/status of each of the assets 105, 110, and 115. An embodiment of the integrating data step 245 includes providing a cache in communication with a series of data repositories. The cache generally includes a computer-readable storage medium operable to provide reduced access time to a "snapshot" (e.g., most recently updated) of more frequently analyzed data. An embodiment of the integrating step 245 can also include creating a uniform schema of the various types of acquired data, and removing inconsistencies in acquired data. Examples of inconsistencies in the acquired data can include field names (e.g., serial numbers, social security numbers, etc.).

Step 250 includes preparing the data regarding the states of the series of assets 105, 110, and 115. An embodiment of the preparing step 250 includes accessing or receiving data from a cache and data repositories, and reducing or filtering the data to a level and form appropriate for analysis. Examples of techniques employed in the filtering of the data include summarization, generalization, horizontal reduction and vertical reduction, lossy compression, loss-less compression, etc.

Step 255 includes analyzing the data regarding movement relative to states or indicators 220, 225, 230, 235 and 240 of the series of assets 105, 110, and 115. The analyzing step 255 includes performing analyses in tracking movement of the assets 105, 110, and 115 between states and locations within the customer facility, and to perform comparison analyses with the goal of limiting undesired movement of the assets 105, 110, and 115 of a particular state 220, 225, 230, 235, and 240, to prevent undesired movement of the assets 105, 110, 115 to locations correlated to particular changes in states 220, 225, 230, 235, or 240, and to increase efficiency in movement of the assets between states and locations of the facility.

One embodiment of the analyzing step 255 includes comparing a change in the location of each of the assets 105, 110, and 115 to the assigned or identified status indicator 220, 225, 230, 235, and 240 and relative to a predetermined location change rule stored in the memory 160. The step 255 can include detecting a status or state indicator 220, 225, 230, 235, or 240 can be predetermined to be invalid or unassignable for a particular location according to comparison to a predetermined rule or schedule. For example, assigning the asset 105, 110, or 115 to be in the USE state 220 can be predetermined to be invalid or unassignable if the location of asset 105, 110, or 115 is in a storage room. However, assigning the asset 105, 110, or 115 to be in the USE state 220 can be predetermined to be valid or unassignable if the location of asset 105, 110, or 115 is in a patient room according to the predetermine rule or schedule stored in the memory 165.

FIG. 4 illustrates another example of predetermined rules or schedules that can employed in analyzing tracked movements of the assets 105, 110 and 115 from the USE state 220 to other states 225, 230, 235 and 240. Valid movement or flow (illustrated by solid arrows) of the assets 105, 110, and 115 from USE state 220 is to the DIRTY state 225, the CLEANING state 230, or the SERVICE state 240. Invalid or undesired movement (illustrated by dashed arrows) of the assets 105, 110, and 115 from the USE state 220 include to the INVENTORY state 235. According to another embodiment, the system 100 can identify USE1 state that is different from USE2 state, and an invalid movement of the assets 105, 110, and 115 is between USE1 and USE2 states.

FIG. 5 illustrates an example of analyzing tracked movements of the assets 105, 110, and 115 from the DIRTY state 225. Valid movement or flow (illustrated by solid arrows) of the assets 105, 110, and 115 from DIRTY state 225 is to the CLEANING state 230 and the SERVICE state 240. Invalid moves (illustrated by dashed arrows) from the DIRTY state 225 include to the USE state 220 and the INVENTORY state 235.

FIG. 6 illustrates an example of analyzing tracked movements of the assets 105, 110, and 115 from the CLEANING state 230. Valid moves (illustrated by solid arrows) from the CLEANING state 230 include to the INVENTORY state 235 or the SERVICE state 240. Invalid moves (illustrated by dashed arrows) from the CLEANING state 230 include to the USE state 220 and the DIRTY state 225.

FIG. 7 illustrates an example of analyzing tracked movements of the assets 105, 110, and 115 from the INVENTORY state 235. Valid moves (illustrated by solid arrows) from the INVENTORY state 235 include to the USE state 220 and the SERVICE state 240. Invalid moves (illustrated by dashed arrows) from the INVENTORY state 235 include to the CLEANING state 230 and the DIRTY state 225.

FIG. 8 illustrates an example of analyzing tracked movements of the assets 105, 110, and 115 from the SERVICE state 240. Valid moves (illustrated by solid arrows) from the SERVICE state 240 include to the CLEANING state 230, or otherwise be discarded or trashed and no longer tracked by the system 100. Invalid moves (illustrated by dashed arrows) from the SERVICE state 240 include to all other states 220, 225, 235 and 240. Alternatively, the SERVICE state 240 may include a second CLEANING state (not shown) similar to the CLEANING state 230 described above. According to this alternative embodiment, valid moves from the SERVICE state 240 may further include directly to the INVENTORY state 235, bypassing the CLEANING state 230.

Each of the above examples can be stored as a predetermined rule equating to valid or invalid movements of the assets 105, 110, and 115 as represented by a computer-readable program instructions for storage in the memory 160 or a product that includes a medium operable to record computer-readable program instructions.

Another embodiment of the analyzing step 225 can include comparing the measured dwelling time 242 and/or the quantity 244 (See FIG. 3) of assets 105, 110, and 115 or types thereof relative to minimum and maximum threshold values.

Referring back to FIG. 2, step 260 includes communicating the data and output from the analyzing step 255 through the system 100. For example, the communicating step 260 can include transmission of data or analysis output representative of a valid or invalid movement of the asset 105, 110, and 115, and a valid or invalid change in the status indicator 220, 225, 230, 235 and 240 of the asset 105, 110, 115.

Step 265 includes generating a display at the output 170. According to one embodiment, if the analysis output from step 260 is a signal representative of an invalid or undesired move or change in location. The displaying step 265 can also include generating a signal to cause an alarm indicative of the invalid movement of the asset 105, 110, and 115 for viewing at the output 170. The display can include an alarm light, a flashing screen, an audible alarm, a text message, an email message, or other alarm form indicative of an invalid movement or otherwise the dwelling time 242 or quantity 244 (See FIG. 3) outside a threshold range. The displaying step 265 can further include generating a report on a monitor or printing a report on a printer that includes an updated illustration of a summary of the locations of the assets 105, 110 and 115, the statuses or states 220, 225, 230, 235 and 240 of the assets 105, 110 and 115, a total number of assets 105, 110 and 115 with a current status or state indicator 220, 225, 230, 235 and 240, and the output of the analysis step 260 including dwelling times 242 and quantities 244 (See FIG. 3) of the assets 105, 110, and 115 at each state 220, 225, 230, 235 and 240.

Step 270 includes updating the memory 160 with the acquired data of the locations of the assets 105, 110, and 115, the statuses of the assets 105, 110, and 115, and the generated output of the analysis step 260. Step 280 is the end of the method 200.

The above-described method 200 can also be represented as a product 300 with a medium operable to record and store a series of modules of computer-readable program instructions for execution by the processor 155. Referring to FIG. 9, an embodiment of the product 300 includes a first module 305 comprising computer-readable program instructions representative of tracking movement of the assets 105, 110, and 115 as described in step 210, assigning or identifying a series of status indicators of step 205, a second module 310 comprising computer-readable program instructions representative of identifying and assigning status or state indicators as described in step 215, a third module 315 comprising computer-readable program instructions representative of integrating the acquired data as described in step 245, a fourth module 320 comprising computer-readable program instructions representative of preparing the acquired data as described in step 250, a fifth module 325 comprising computer-readable program instructions representative of analyzing the acquired data and comparing movements and changes in states 220, 225, 230, 235, and 240 of the assets 105, 110, and 115 as described in step 255, a sixth module 330 comprising computer-readable program instructions representative of communicating the data and output of the analysis step 255 as described in step 260, an seventh module 335 comprising computer-readable program instructions representative of generating a display of the acquired data of location and states 220, 225, 230, 235, and 240 and respective tracked movements and the generated output from the analysis step 235 as described in step 265, and an eighth module 340 comprising computer-readable program instructions representative of updating the memory 165 as described in step 270.

A technical effect of the system 100 and method 200 and product 300 described above is to execute predetermined rules in specifying valid movements, invalid movements, and inefficient movements of the assets 105, 110, and 115 between locations dependent on the detected statuses of the assets 105, 110, and 115. Tracking movements relative to the statuses increases efficient and safe handling of the assets 105, 110, and 115, and provides for an alarm indication to an operator upon detecting invalid movements of the assets 105, 110, and 115 that may decrease a likelihood of safety to the patient.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system to manage movement of at least one asset, the system comprising:
    at least one tracking element operable to generate a signal representative of a location of the at least one asset; and
    a controller in communication with the at least one tracking element, the controller including a processor in communication with a memory, the memory including a plurality of program instructions to instruct the processor in execution of the steps of:
    receiving the signal representative of the location of the at least one asset having a unique identifier,
    identifying one of a plurality of status indicators for the at least one asset dependent on the signal representative of the location of the of the at least one asset,
    comparing a change in one of the plurality of status indicators of the at least one asset relative to at least one predetermined rule, and
    generating a display illustrative of a valid or an invalid change in the one of the status indicator in response to an output of the comparing step,
    wherein the plurality of status indicators include a USE state, a DIRTY state, a CLEANING state, an INVENTORY state, and a SERVICE state, wherein the USE state represents the at least one asset being utilized by a subject, wherein the DIRTY state represents the at least one asset being stored temporarily before being taken to one of a location of the CLEANING state or the SERVICE state, wherein the CLEANING state represents the at least one asset either waiting to be or in the process of being cleaned, wherein the INVENTORY state represents the at least one asset previously moved from the CLEANING state is now in storage until deployed for use in accordance with the USE state, and wherein the SERVICE state represents the at least one asset requiring repair or to be discarded, and wherein the at least one predetermined rule includes a rule of invalid movement of the at least one asset from the DIRTY state to one of the USE state and the INVENTORY state without passing through the CLEANING state.

2. The system of claim 1, wherein a first of the plurality of status indicators is invalid for a first location while at least one of the remaining plurality of status indicators is valid for the first location according to a predetermined schedule rule stored in the memory, wherein if the system detects the at least one asset at the first location simultaneously with the first of the plurality of status indicators, the system generates an alarm.

3. The system of claim 1, wherein the plurality of program instructions further representative of the step of:
  measuring and recording a dwelling time of at least one asset at each of the plurality of status indicators; and
  measuring and recording a quantity of the least one assets at each of the plurality of status indicators.

4. The system of claim 1, wherein the plurality of program instructions further representative of the step of:
  generating a signal representative of a most current location and a most current status indicator of the at least one asset for illustration on a monitor.

5. The system of claim 1, the plurality of program instructions further representative of the steps of:
  comparing a change from a first to a second status indicator relative to at least one predetermined rule;
  generating an output representative of an invalid change from the first to the second of the plurality of status indicators according to the at least one predetermined status indicator change rule; and
  generating a signal in response to the output so as to cause an alarm on the display illustrative of the invalid change from the first to the second status indicator.

6. The system of claim 1, wherein the at least one predetermined rule further includes at least one of the following:
  a rule of invalid movement of the at least one asset from the USE state to the INVENTORY state;
  a rule of invalid movement of the at least one asset from the CLEANING state to one of the USE state and the DIRTY state;
  a rule of invalid movement of the at least one asset from the INVENTORY state to one of the CLEANING state and the DIRTY state; and
  a rule of invalid movement of the at least one asset from the SERVICE state to all other states except the CLEANING state.

7. The system of claim 1, wherein the at least one predetermined rule includes:
  a rule of valid movement of the at least one asset from the USE state to one of the DIRTY state, the CLEANING state, and the SERVICE state;
  a rule of valid movement of the at least one asset from the DIRTY state to one of the CLEANING state and the SERVICE state;
  a rule of valid movement of the at least one asset from the CLEANING state to one of the INVENTORY state and the USE state; and
  a rule of valid movement of the at least one asset from the INVENTORY state to one of the USE state and the SERVICE STATE.

8. A method of managing movement of at least one asset between a plurality of locations, the method comprising the steps of:
  receiving the signal representative of the location of the at least one asset having a unique identifier;
  identifying one of a plurality of status indicators for the at least one asset dependent on the signal representative of the location of the of the at least one asset, the plurality of status indicators including a USE state, a DIRTY state, a CLEANING state, an INVENTORY state, and a SERVICE state, where the USE state represents the at least one asset being utilized by a subject, wherein the DIRTY state represents the at least one asset being stored temporarily before being taken to one of a location of the CLEANING state or the SERVICE state, wherein the CLEANING state represents the at least one asset either waiting to be or in the process of being cleaned, wherein the INVENTORY state represents the at least one asset previously moved from the CLEANING state is now in storage until deployed for use in accordance with the USE state, and wherein the SERVICE state represents the at least one asset requiring repair or to be discarded;
  comparing a change in one of the plurality of status indicators of the at least one asset relative to at least one predetermined rule, the at least one predetermined rule including a rule of invalid movement of the at least one asset from the DIRTY state to one of the USE state and the INVENTORY state without passing through the CLEANING state; and
  generating a display illustrative of a valid or an invalid change in the one of the status indicator in response to an output of the comparing step.

9. The method of claim 8, the steps further comprising measuring a dwelling time of the at least one asset at each of the plurality of status indicators.

10. The method of claim 8, the steps further comprising automatically assigning the status indicator to the at least one asset according to a predetermined schedule correlated to the location the at least one asset.

11. The method of claim 8, the steps further comprising detecting a first of the plurality of status indicators as invalid for a first location while detecting at least one of the remaining plurality of status indicators as valid for the first location according to the predetermined schedule, wherein if the system detects the at least one asset at the first location simultaneously with the first status indicator, the method including the step of generating a signal to cause an alarm for illustration on the display.

12. The method of claim 8, the steps further comprising:
  generating a signal representative of a most current location and a most current status indicator of the at least one asset for illustration on a monitor.

13. The method of claim 8, the steps further comprising:
  comparing a change from a first to a second status indicator relative to an at least one predetermined status indicator change rule;
  generating an output representative of an invalid change from the first to the second of the plurality of status indicators according to the at least one predetermined status indicator change rule; and generating an alarm illustrative of the invalid change from the first to the second status indicator.

14. The method of claim 8, wherein the at least one predetermined status indicator change rule further includes at least one of the following:

a first rule of invalid movement of the at least one asset from the USE state to the INVENTORY state;

a rule of invalid movement of the at least one asset from the CLEANING state to one of the USE state and the DIRTY state;

a rule of invalid movement of the at least one asset from the INVENTORY state to one of the CLEANING state and the DIRTY state; and a rule of invalid movement of the at least one asset from the SERVICE state to all other states except the CLEANING state.

15. The method of claim 8, the steps further comprising measuring and recording a quantity of the least one assets at each of the plurality of status indicators for illustration on the display.

* * * * *